United States Patent [19]

Smith

[11] Patent Number: 4,831,663

[45] Date of Patent: May 16, 1989

[54] DIGITAL SIGNAL TRANSMISSION/RECEPTION USING DIFFERENTIAL POLARIZATION MODULATION/DEMONDULATION

[75] Inventor: David W. Smith, Woodbridge, England

[73] Assignee: British Telecommunications public limited company, England

[21] Appl. No.: 14,046

[22] PCT Filed: Jun. 18, 1986

[86] PCT No.: PCT/GB86/00354

§ 371 Date: Feb. 18, 1987

§ 102(e) Date: Feb. 18, 1987

[87] PCT Pub. No.: WO86/07658

PCT Pub. Date: Dec. 31, 1986

[30] Foreign Application Priority Data

Jun. 19, 1985 [GB] United Kingdom ............... 8515499

[51] Int. Cl.⁴ .............................................. H04B 9/00
[52] U.S. Cl. ................................... 455/616; 455/606; 455/608; 455/612; 455/615; 455/617; 455/618
[58] Field of Search ............... 455/606, 607, 608, 612, 455/616, 617, 618

[56] References Cited

U.S. PATENT DOCUMENTS 2,288,802  7/1942  Hammond ........................... 250/10
3,353,896 11/1967  Blattner .............................. 455/616
3,404,353 10/1968  Harris et al. ......................... 332/1
3,408,498 10/1968  Ohm .................................. 455/616
3,584,221  6/1971  Furukawa ........................... 350/157
3,971,930  7/1976  Fitzmaurice et al. ................ 455/616

FOREIGN PATENT DOCUMENTS 0138584  4/1985  European Pat. Off. .
112140A  7/1984  Japan .

OTHER PUBLICATIONS

Elect. Letters, vol. 20, #24, 11-22-84, 1022-1023, "Novel Optical FSK Heterodyne Filter Detection System Using a Directly Modulated DFB Laser Diode", Emura et al.

Primary Examiner—Robert L. Griffin
Assistant Examiner—Leslie Van Beek
Attorney, Agent, or Firm—Nixon & Vanderhye

[57] ABSTRACT

Digital information is modulated onto an optical carrier using differential-polarization encoding, passed through a transmission medium which may produce unpredictable long-term changes in polarization and then demodulated using differential-polarization detection techniques (e.g., by comparing relative polarization between successive clock periods). Other modulated carrier parameters may be used to simultaneously carry further information. Special polarization modulation and detection techniques are also disclosed.

22 Claims, 3 Drawing Sheets

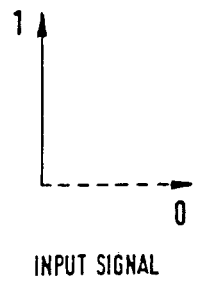
INPUT SIGNAL
LOCAL OSCILLATOR
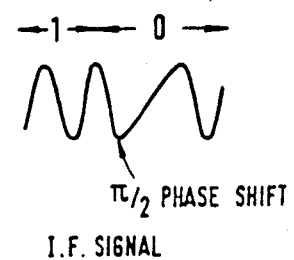
$\pi/2$ PHASE SHIFT
I.F. SIGNAL
FIG.5(a)　　FIG.5(b)　　FIG.5(c)
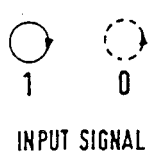
INPUT SIGNAL
LOCAL OSCILLATOR
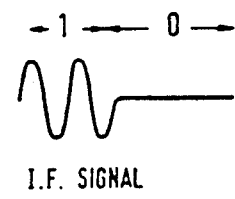
I.F. SIGNAL
FIG.6(a)　　FIG.6(b)　　FIG.6(c)

DIGITAL SIGNAL TRANSMISSION/RECEPTION USING DIFFERENTIAL POLARIZATION MODULATION/DEMONDULATION

BACKGROUND OF THE INVENTION

1. Field of the Invention

The invention relates to the transmission of digital information in which electro-magnetic radiation is modulated in accordance with the information.

2. Description of Related Art

Various detection methods have been proposed in the past for demodulating the transmitted radiation including coherent detection and direct detection. Although coherent detection has major advantages over direct detection, it has the drawback of polarization sensitivity. This problem could, in principle, be eliminated if a transmission medium could be developed which was polarization holding.

In the case of optical radiation, special optical fibres have been developed which are substantially polarization holding but these have complex structures and much higher losses (and are more expensive) when compared to standard circular symmetric monomode fibres. Furthermore, since large quantities of standard optical fibre have already been installed, are being installed, and are planned for the telecommunications, which initially use polarization insensitive to direct detection, it is desirable to devise a transmission method and system which is compatible with these fibre coherent networks.

So far two schemes have been proposed that will enable coherent detection to be used with standard fiber; these are active polarization control and polarization diversity. The former is capable of eliminating all polarisation penalties. However, an extra opto-mechanical or electro-optic device is required in either the local oscillator or signal path at the receiver. This complicates the receiver and could also result in an insertion loss penalty. Polarization diversity reception eliminates the need for extra optical control devices in the receiver but requires the addition of a polarizing beam splitter and a second photodiode, amplifier chain and intermediate frequency (I.F.) demodulator. With polarization diversity reception there can be up to 3 dB receiver sensitivity penalty for certain combinations of input polarization and local oscillator polarization states when the outputs of the two I.F. demodulators are simply combined (although it may be possible to reduce this penalty to about 1 dB with more complex post demodulator processing).

These two methods of overcoming polarization problems both result in a more complex receiver which although possibly acceptable in a long distance high capacity point-to-point transmission link could introduce a significant cost penalty in a local wideband distribution scheme or LAN/MAN type application.

SUMMARY OF THE INVENTION

A method of transmitting digital information comprises generating a polarized electro-magnetic wave; modulating the wave in successive clock periods by causing changes in polarization of the wave in accordance with the information; transmitting the modulated wave; and detecting changes in polarization of the transmitted wave to regenerate the information.

The invention, instead of making use of the absolute polarization of radiation, detects changes in polarization state between adjacent bits at the receiver. The absolute polarization does not matter.

We have realized that although the output state of polarization of a long transmission path using standard optical fibre fluctuates, it does so only slowly. For cable buried under the ground, where the temperature remains fairly stable, significant fluctuations may not occur over several hours.

The polarization modulation could be based on any of the following known effects: Kerr, Faraday rotation or TE to TM conversion.

The detection of the transmitted wave may be achieved in any conventional manner. Preferably, however, the detecting step comprises combining the transmitted modulated wave with a detection signal of fixed polarization to generate a wave with an intermediate frequency, and detecting changes in phase and/or amplitude of the intermediate frequency wave to regenerate the information.

In some examples, the modulation step may comprise switching the polarization of the wave between two values at for example 90°. Alternatively, a change in polarization within a clock period may be achieved by ramping the polarization between two polarizations (i.e, by more gradually changing polarization within a clock period, such as by linearly changing polarization with respect to time over a substantial portion of a clock period thus defining a "ramp" if polarization is plotted versus time).

Although the invention is applicable to electro-magnetic radiation with a variety of wavelengths, it is particularly applicable to wavelengths in the optical domain. In this specification, the term optical is intended to refer to that part of the electro-magnetic spectrum which is generally known as the visible region together with those parts of the infra-red and ultra-violet regions at each end of the visible region which are capable of being transmitted by dielectric optical waveguides such as optical fibres.

It is particularly advantageous if the method further comprises additionally modulating one or more of the phase, amplitude, and frequency of the polarized electro-magnetic wave in accordance with the digital information.

This facility can be used in two ways. Firstly, double the amount of information can be sent on the transmitted wave thus doubling the transmission rate, or alternatively the digital information used to modulate the one or more of the phase, amplitude and frequency of the polarised electro-magnetic wave may be the same information which is used to modulate the polarization of the wave. The latter possibility provides a way of reducing the chances of error in detecting the transmitted information.

In accordance with a second aspect of the present invention, a digital information transmission system comprises a source of polarized electro-magnetic radiation; modulating means responsive to the information for causing in successive clock periods changes in polarization of the radiation in accordance with the information; transmitting means for transmitting the modulated radiation; and detecting means for receiving the transmitted modulated radiation and for detecting changes in polarization of the radiation to regenerate the information.

The source of electro-magnetic radiation may comprise for example a laser.

In one particularly convenient arrangement in which the radiation has a wavelength in the optical domain, the apparatus further comprises a birefringent medium; and means for modulating the frequency of the polarised electro-magnetic radiation in accordance with the information, the frequency modulated radiation being incident on the birefringent medium whereby corresponding changes in polarization of the radiation are caused.

This provides a particularly elegant arrangement which would eliminate the need for an external modulator and thus avoid the losses associated with such a modulator. The output polarization from the birefringent medium, such as a short length of optical fibre, is dependant on the optical frequency of the source and can therefore be modulated as the source frequency is modulated.

We believe that the invention is particularly applicable to overcoming the problem of long term polarization stability in coherent transmission systems using monomode fibre. The invention enables considerable simplification of the detecting means such a heterodyne receiver. This will be of benefit in future wideband distribution schemes. There may also be some scope for using the invention in optical networks that have all optical sources centrally located. In this case it may be possible to provide polarization modulators at remote terminals fed by continuous wave light from a central laser bank.

BRIEF DESCRIPTION OF THE DRAWINGS

Some examples of methods and systems in accordance with the invention will now be described with reference to the accompanying drawings, in which:

FIGS. 5a–c and 6a–c illustrate the waveforms of input signals, local oscillator signals, and IF signals in two different examples.

DESCRIPTION OF THE PREFERRED EMBODIMENTS

Figure 1:
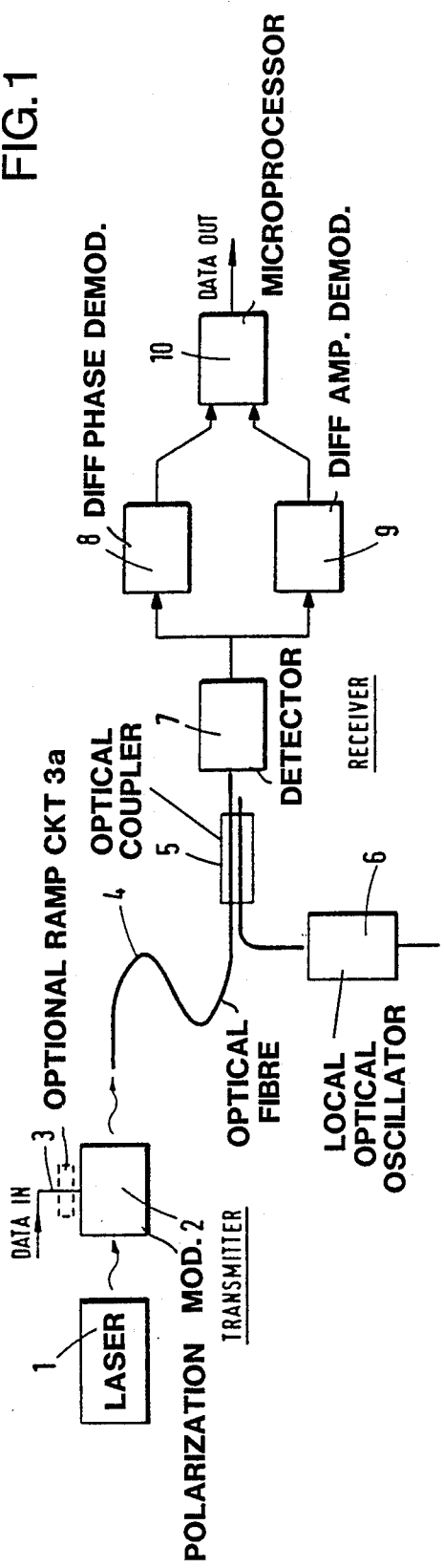
FIG. 1 illustrates schematically one example of a transmission system.

The system shown in FIG. 1 comprises a semiconductor laser 1 which generates a linearly polarized beam of optical radiation. The beam is fed to a polarization modulator 2 of conventional form which is controlled via a data input 3. At successive clock periods, data is applied to the modulator 2 which causes either a change or no change in the polarization of the incoming beam. For example, a binary digit "1" may cause a 90° switch in polarization whereas a binary digit "0" will cause no change. The modulated radiation is then fed into a conventional monomode optical fibre 4 defining a transmission path.

At a receiving station, the optical fibre 4 is connected to an optical coupler 5 having a second input connected to a local oscillator 6 constituted by a semiconductor laser which generates circularly polarized optical radiation. The optical coupler 5 combines the incoming modulated optical signal with the local oscillator signal and the resultant IF signal is fed to a detector 7.

Information is contained in both the differential phase, ie. the change in phase between clock periods, and the differential amplitude of the IF signal, that is the change in amplitude between clock periods.

The relative magnitude of the demodulated phase signal to the demodulated amplitude signal will depend on the relationship of the received state of polarization to that of the local oscillator polarization. For certain combinations of input signal to local oscillator polarization there will be no useful amplitude information. Take, for instance, the case when the input polarization is switching between two linear orthogonal states (FIG. 5A) and the local oscillator is circular (FIG. 5B). With this combination, although the IF amplitude will remain constant, the IF phase will switch in sympathy with the input signal's polarization (FIG. 5C). In contrast, consider the case, again with a circular local oscillator (FIG. 6B), where the input signal is switching between right circular and left circular (FIG. 6A). This time the IF envelope switches completely (FIG. 6C). Therefore to determine that a polarization change has taken place it is necessary to process both the demodulated differential phase and envelope signals together. To give optimum performance in some cases it may better not to represent symbols by step changes in polarization states but by some other function; for example a polarization ramp (e.g., a more gradual polarization change with respect to time via a conventional ramp circuit 3a).

The detector 7 which includes a filter generates an output signal which is fed in parallel to a differential phase demodulator 8 and a differential amplitude demodulator 9. The output signals from these demodulators 8, 9 are fed to a micro-processor 10 which provides an output signal representing the original data. The micro-processor 10 could select between the signals from the phase demodulator 8 and amplitude demodulator 9 the signal with the largest magnitude or it could add the two signals to produce a resultant signal.

Figure 2:
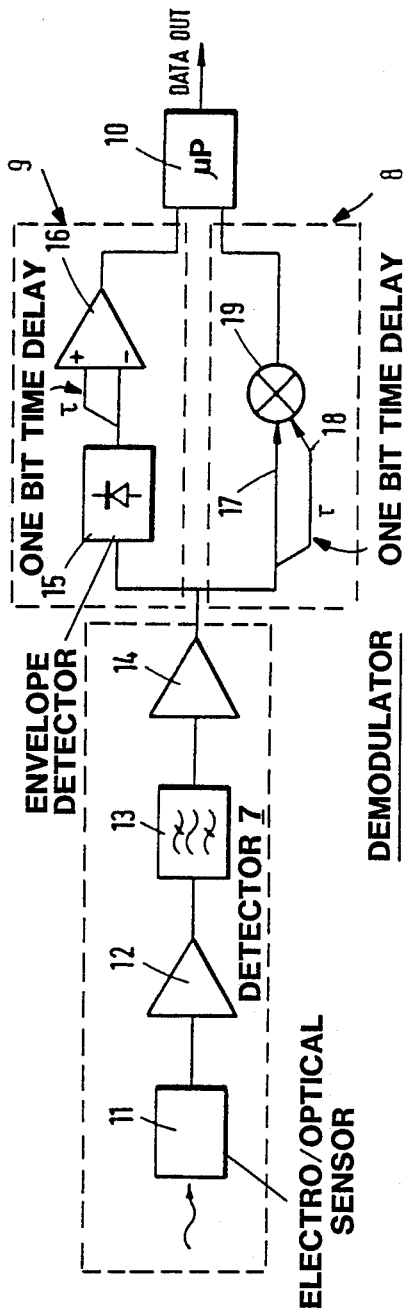
FIG. 2 illustrates the receiver of FIG. 1 in more detail.

FIG. 2 illustrates one way in which the demodulators 8,9 could be implemented. The detector 7 includes a sensor 11 such as a photodiode whose output is fed to an amplifier 12 and then to a filter 13 and a further amplifier 14. The amplitude demodulator 9 is constituted by a conventional envelope detector 15 whose output is split and fed in parallel to the inverting and non-inverting inputs of a differential amplifier 16. The path length to the non-inverting input is longer than that to the inverting input so that a single clock period (or bit period) delay is applied to that bit enabling comparison of signal levels between adjacent bits to take place. In a similar manner the phase change between adjacent clock periods or bits is determined by splitting the path from the amplifier 14 into two 17, 18, delaying one path 18 by a single bit period, and multiplying the two signals in a double balanced modulator 19.

The micro-processor 10 determines what weighting should be given to each of the two demodulated signals. In the simplest case it may be possible to take the signal which has the largest peak-to-peak level.

Figures 3, 4:
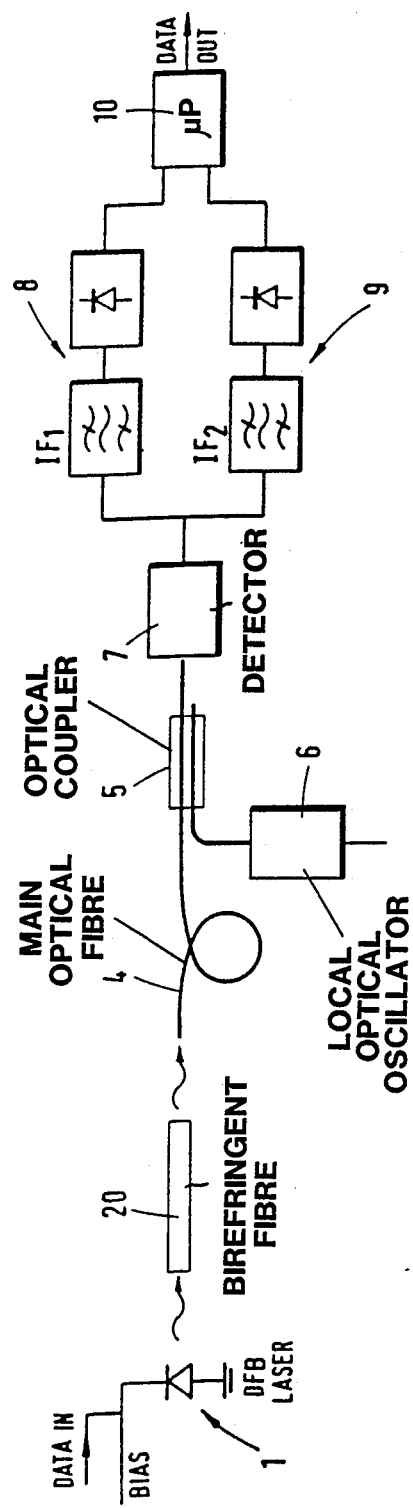
FIG. 3 illustrates a second example of a transmission system.
FIG. 4 illustrates graphically a detection method.

A second example is illustrated in FIG. 3. In this example the frequency of the optical radiation generated by the semiconductor laser 1 is modulated directly by the digital data. This frequency modulated radiation, of fixed polarization, is fed to a short length of high birefringence fibre 20. Preferably, the frequency modulated beam is launched at $\pi/4$ to the birefringent axis of the fibre 20. The output polarization from this short length of fibre 20 will be dependant on the optical frequency of the source and can therefore be modulated as the laser frequency is modulated. The beam output from the fibre 20 is then coupled to the main optical fibre 4.

Frequency modulation of a semiconductor laser can be achieved directly by control of injection current or by acoustic wave interaction. In the simple case of a laser directly frequency shift keyed betwen $f_1$ and $f_2$ (where the difference between these optical frequencies is much greater then the data rate) it is only necessary to demodulate just one of the two frequencies to determine the symbol transmitted; this single filter detection of FSK gives the same performance as ASK. If it is now arranged that the frequency shift is sufficient for the two signals to have orthogonal polarizations we now have a choice of two signals that could be detected at the distant receiver and either signal containing the transmitted information. The local oscillator frequency at the receiver could be tuned to whichever signal presented the best polarization match.

Moreover, by careful selection of the IF frequency with respect to $f_1-f_2$ it may be possible to site the signal associated with the orthogonal polarization state near the image band of the detected signal. Therefore under this condition where the local oscillator frequency is positioned just off center of $f_1-f_2$ either signal would automatically appear in the receiver IF bandwidth, individually or together depending on the received polarization state. In this case polarization diversity may be possible without retuning the frequency of the receiver local oscillator laser.

I claim:

1. A method of transmitting digital information, the method comprising:
   generating a polarized electro-magnetic wave;
   modulating the wave in successive clock periods by causing differential changes in polarization of the wave from one clock period to the next in accordance with the digital information;
   transmitting the modulated wave; and
   detecting differential changes in polarization of the transmitted wave by comparing the received polarization during one clock period with the received polarization during another clock period to regenerate the digital information;
   wherein a change in polarization within a clock period is achieved by ramping the polarization between two polarizations.

2. A method according to claim 1, wherein the detecting step comprises:
   combining the transmitted modulated wave with a detection signal of fixed polarization to generate a wave with an intermediate frequency, and detecting changes in phase and/or amplitude of the intermediate frequency wave to regenerate the digital information.

3. A method according to claim 2, wherein the detection signal is circularly polarized.

4. A method according to any of claims 1, 2 or 3, wherein the electro-magnetic wave has a wavelength in the optical domain.

5. A method according to any of the preceding claims 1, 2 or 3, further comprising:
   additionally modulating one or more of the phase, amplitude, and frequency of the polarized electro-magnetic wave in accordance with the digital information.

6. A method according to claim 5, wherein the digital information used to modulate the one or more of the phase, amplitude and frequency of the polarized electro-magnetic wave is the same information which is used to modulate the polarization of the wave.

7. A method as claimed in any of claims 1, 2 or 3 for coherent transmission of digital information.

8. A digital information transmission system for transmitting optical signals, said system comprising:
   a birefringent medium;
   a source of polarized electro-magnetic radiation;
   means for modulating the frequency of the polarized electro-magnetic radiation in accordance with the digital information, the frequency modulated radiation being incident on the birefringent medium whereby corresponding changes in polarization of the radiation are caused;
   transmitting means for transmitting the modulated radiation; and
   differential detecting means for receiving the transmitted modulated radiation and for detecting differential changes in polarization of the radiation by comparing the received polarization during one clock period with the received polarization during another clock period to regenerate the digital information.

9. A system according to claim 8, wherein the radiation has a wavelength in the optical domain, the transmitting means including an optical waveguide.

10. A coherent digital information transmission system as claimed in claim 8.

11. A digital optical signal transmission system comprising:
    an optical signal source including means for changing the polarization of an output optical signal from one clock period to the next in accordance with clocked input digital data by ramping the polarization between two polarizations;
    non-polarization holding optical transmission media for transmitting said output optical signal from a first site to a second site without holding constant absolute polarization of such signals during transmission; and
    a differential-polarization optical receiver located at said second site and connected to receive the transmitted optical signal and to regenerate said clocked input digital data by detecting relative changes in received signal polarization from one clock period to the next without comparison to absolute polarization references.

12. A digital optical signal transmission system as in claim 11 wherein said receiver comprises:
    an optical local oscillator producing an unmodulated continuous wave optical signal having a polarization characteristic which remains substantially constant over adjacent clock pulse periods;
    an optical coupler for optically combining an incoming modulated optical carrier signal with said continuous wave optical signal;
    an opto-electric detector arranged to receive such combined optical signal and to produce a corresponding detected electrical signal; and
    demodulation means for regenerating electrical digital data signals from said detected electrical signal by detecting differences in at least one predetermined parameter of the detected electrical signal between adjacent clock periods.

13. A differential-polarization optical signal receiver for regenerating digital data signals modulated onto an optical carrier by differentially polarizing same during successive clock periods by ramping the polarization between two polarizations, said receiver comprising:

an optical local oscillator producing an unmodulated continuous wave optical signal having a polarization characteristic which remains substantially constant over adjacent clock pulse periods;

an optical coupler for optically combining an incoming modulated optical carrier signal with said continuous wave optical signal;

an opto-electric detector arranged to receive such combined optical signal which has ramped polarization between two polarizations and to produce a corresponding detected electrical signal; and demodulation means for regenerating electrical digital data signals from said detected electrical signal by detecting differences in at least one predetermined parameter of the detected electrical signal between adjacent clock periods.

14. A method of transmitting digital information, the method comprising:

generating a polarized electro-magnetic wave;

modulating the wave in successive clock periods by causing changes in polarization of the wave in accordance with the digital information by ramping the polarization between two polarizations;

transmitting the modulated wave; and detecting changes in polarization of the transmitted wave to regenerate the digital information by:

(a) combining the transmitted modulated wave with a detection signal of fixed polarization to generate a wave with an intermediate frequency, and (b) detecting changes in phase and/or amplitude of the intermediate frequency wave to regenerate the digital information.

15. A method according to claim 14 wherein the detection signal is circularly polarized.

16. A method according to claim 14 or 15 wherein the electro-magnetic wave has a wavelength in the optical domain.

17. A method according to claim 14 or 15 further comprising additionally modulating one or more of the phase, amplitude, and frequency of the polarized electro-magnetic wave in accordance with the digital information.

18. A method according to claim 17 wherein the digital information used to modulate the one or more of the phase, amplitude and frequency of the polarized electro-magnetic wave is the same information which is used to modulate the polarization of the wave.

19. A digital information transmission system comprising:

a source of polarized electro-magnetic radiation having a wavelength in the optical domain;

modulating means responsive to digital information for causing in successive clock periods changes in polarization of the radiation in accordance with the digital information by ramping the polarization between two polarizations;

transmitting means for transmitting the modulated radiation; and detecting means for receiving the transmitted modulated radiation and for detecting changes in polarization of the radiation to regenerate the digital information, said means for modulating the frequency of the polarized electro-magnetic radiation in accordance with the digital information including a birefringent medium onto which the frequency modulated radiation is incident whereby corresponding changes in polarization of the radiation are caused.

20. A system according to claim 19 wherein the transmitting means includes an optical waveguide.

21. A method as claimed in claim 14, 15, 19 or 20 for coherent transmission of digital information.

22. A coherent digital information transmission system as in claim 19 or 20.

* * * * *